United States Patent [19]

Saito et al.

[11] Patent Number: 5,106,922
[45] Date of Patent: Apr. 21, 1992

[54] SURFACE-TREATED POLYMETHYLSILSESQUIOXANE POWDER

[75] Inventors: Kenji Saito; Hiroshi Kimura; Hideaki Muto, all of Gunma, Japan

[73] Assignee: Toshiba Silicone Co., Ltd., Tokyo, Japan

[21] Appl. No.: 444,239

[22] Filed: Dec. 1, 1989

[30] Foreign Application Priority Data

Dec. 2, 1988 [JP] Japan ................... 63-303941

[51] Int. Cl.$^5$ ............................................. C08F 283/00
[52] U.S. Cl. ........................................ 525/477; 428/405; 428/406; 524/262; 524/265; 524/267; 525/478
[58] Field of Search ............... 428/405, 406; 524/262, 524/267, 265; 525/477, 478

[56] References Cited

U.S. PATENT DOCUMENTS

| | | | |
|---|---|---|---|
| 4,214,914 | 7/1980 | Ivanchev et al. | 428/406 |
| 4,216,024 | 8/1980 | Ivanchev et al. | 428/406 |
| 4,528,390 | 7/1985 | Kimura | 528/21 |
| 4,895,914 | 1/1990 | Saitoh et al. | 525/478 |

Primary Examiner—Melvyn I. Marquis
Attorney, Agent, or Firm—Sughrue, Mion, Zinn, Macpeak & Seas

[57] ABSTRACT

A polymethylsilsesquioxane powder surface-treated with an organosilicone compound represented by the formula:

$$(R^1{}_a R^2{}_{3-a} Si)_b Z$$

wherein $R^1$ represents an alkyl group substituted by a perfluoroalkyl group; $R^2$ represents an unsubstituted monovalent hydrocarbon group; a is an integer of from 1 to 3; b is 1 or 2; and when b is 1, Z is selected from the group consisting of a hydrogen atom, a halogen atom, a hydroxyl group, $-OR^3$, $-NR^3X$, $-ON(R^3)_2$ and $-OCOR^3$, and when b is 2, Z is selected from the group consisting of $-O-$, $-N(X)-$ and $-S-$, in which $R^3$ represents an alkyl group having 1 to 4 carbon atoms and X is selected from the group consisting of a hydrogen atom and an alkyl group having 1 to 4 carbon atoms.

4 Claims, 1 Drawing Sheet

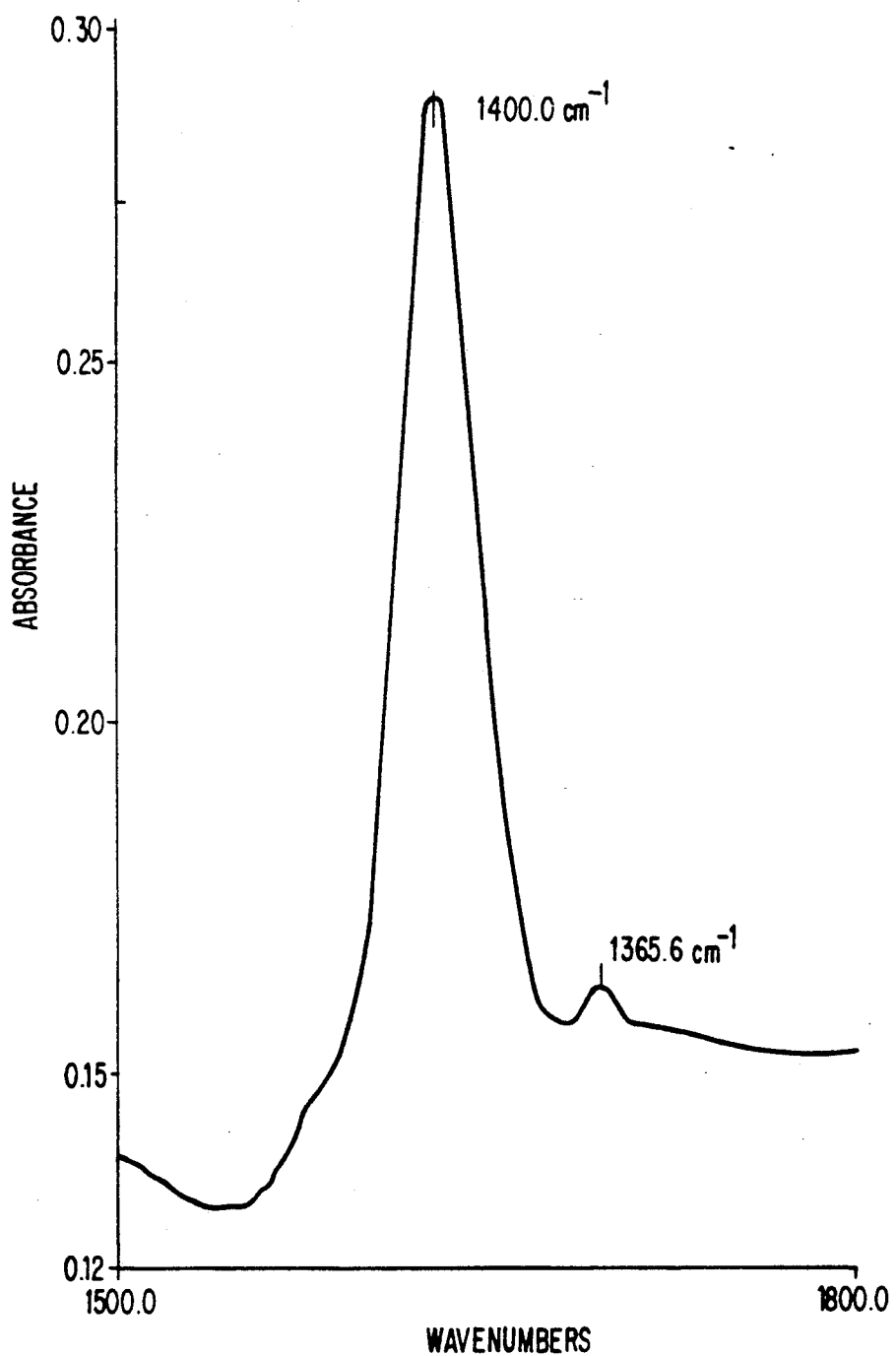
FIGURE

SURFACE-TREATED POLYMETHYLSILSESQUIOXANE POWDER

FIELD OF THE INVENTION

The present invention relates to a surface-treated polymethylsilsesquioxane powder and, more particularly, to a surface-treated polymethylsilsesquioxane powder having extremely good water repellency.

BACKGROUND OF THE INVENTION

It has conventionally been known that a polymethylsilsesquioxane powder is obtained by hydrolysis condensation of a trifunctional silane such as methyltrichlorosilane. For example, Belgian Patent No. 572,412 discloses a process for producing solid polymethylsilsesquioxane powder by hydrolyzing methyltrichlorosilane and water in an atomized state while adding dropwise the methyltrichlorosilane to a large amount of water under stirring. Such a process, however, is disadvantageous in that the polymethylsilsesquioxane powder produced contains a relatively large amount of chlorine atoms which have been produced as a by-product. In order to overcome this problem, JP-A-54-72300 discloses a method in which a methyltrialkoxysilane and/or a partial hydrolyzate thereof is hydrolyzed and condensed in an aqueous solution containing an alkaline earth metal hydroxide or an alkaline metal carbonate. (The term "JP-A" as used herein means an "unexamined published Japanese patent application".)

Although the above method can eliminate the problem of the inclusion of chlorine atoms in the product, it brings about a new problem that the polymethylsilsesquioxane powder produced contains a relatively large amount of an alkaline earth metal or an alkali metal. JP-A-60-13813 discloses a process for producing polymethylsilsesquioxane powder free from the above-described problems and also having excellent fluidity by hydrolyzing and condensing a methyltrialkoxysilane and/or a partial hydrolyzate thereof in an aqueous solution of ammonia and/or amine. Further, JP-A-63-77940 discloses almost true spherical polymethylsilsesquioxane powder. Such a polymethylsilsesquioxane powder obtained by the above conventional techniques is useful as an additive for not only improving the durability and lubricating properties of rubbers or plastics but also imparting water repellency thereto.

However, rubbers, plastics or the like to which the polymethylsilsesquioxane powder obtained by the above prior art method has been added do not always show sufficient water repellency for some uses. This is because a slight quantity of silanol groups exists on the surface of the polymethylsilsesquioxane powder obtained by the prior art method, which leads to the inadequate water repellency of the rubbers or plastics.

One of the present inventors has disclosed that the electrostatically charging property can be imparted to the spherical polymethylsilsesquioxane powder by treating the powder with a compound having at least two functional groups such as alkoxy group in JP-A-63-101855. However, such a polymethylsilsesquioxane powder does not also have sufficiently improved water repellency.

SUMMARY OF THE INVENTION

The present inventors conducted intensive studies for obtaining a polymethylsilsesquioxane powder having excellent water repellency, and as a result, they found that a polymethylsilsesquioxane powder having excellent water repellency can be obtained by surface-treating the polymethylsilsesquioxane powder with an organosilicon compound having one functional group, as disclosed in JP-A-1-185367. The present inventors have further studied in the light of the above finding, and as a result, they have found that the water repellency of such polymethylsilsesquioxane powder can be further improved by introducing a perfluoroalkyl group into at least one of the monovalent hydrocarbon groups bonded to the silicon atom(s). This invention has been completed based on this finding.

Accordingly, an object of the present invention is to provide polymethylsilsesquioxane powder having excellent water repellency.

BRIEF DESCRIPTION OF THE DRAWING

The FIGURE is an IR spectrum of the polymethylsilsesquioxane powders obtaned in the Examples of the present invenion.

DETAILED DESCRIPTION OF THE INVENTION

The polymethylsilsesquioxane powder according to the present invention is a powder surface-treated with an organosilicon compound represented by the formula:

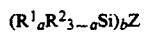

$(R^1_a R^2_{3-a} Si)_b Z$ wherein $R^1$ represents an alkyl group substituted by a perfluoroalkyl group; $R^2$ represents an unsubstituted monovalent hydrocarbon group; a is an integer of from 1 to 3; b is 1 or 2; and when b is 1, Z is selected from the group consisting of a hydrogen atom, a halogen atom, a hydroxyl group, $-OR^3$, $-NR^3X$, $-ON(R^3)_2$ and $-OCOR^3$, and when b is 2, Z is selected from the group consisting of $-O-$, $-N(X)-$ and $-S-$, in which $R^3$ represents an alkyl group having 1 to 4 carbon atoms and X is selected from the group consisting of a hydrogen atom and an alkyl group having 1 to 4 carbon atoms.

The alkyl group of $R^1$ in the formula representing the organosilicon compound is a substituted monovalent hydrocarbon group in which at least one hydrogen atom has been substituted by a perfluoroalkyl group. $R^1$ is preferably a group represented by the formula, $R^4Q-$ in which $R^4$ represents a perfluoroalkyl group having 1 to 20 carbon atoms and Q represents an unsubstituted divalent alkylene group having 2 to 6 carbon atoms, from the standpoints of easily synthesizing the organosilicon compound of the formula and enhancing the water repellency imparting effect to the polymethylsilsesquioxane powder.

Examples of the monovalent hydrocarbon group of $R^2$ in the formula representing the organosilicon compound include an alkyl group such as methyl, ethyl, propyl, butyl, pentyl, hexyl, heptyl, octyl, nonyl, decyl or dodecyl; a cycloalkyl group such as cyclopentyl or cyclohexyl; an aralkyl group such as 2-phenylethyl or 2-phenylpropyl; an aryl group such as phenyl or tolyl; and an alkenyl group such as vinyl or allyl. Preferred of those is an alkyl group having 1 to 4 carbon atoms from the standpoint of the easy synthesis of the organosilicon compound.

The number a in the formula representing the organosilicon compound is an integer of from 1 to 3, with preferred a being 1 from the standpoint of the easy synthesis of the organosilicon compound.

In the formula, b is 1 or 2 depending upon the kind of the functional group represented by Z.

Specific examples of the organosilicon compound represented by the formula include the following compounds:

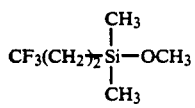

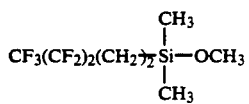

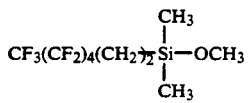

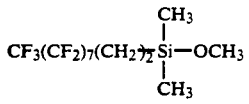

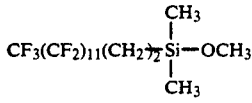

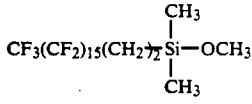

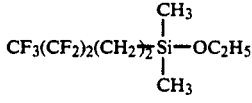

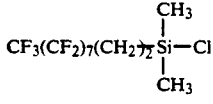

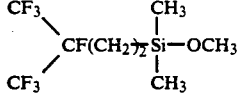

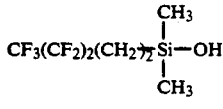

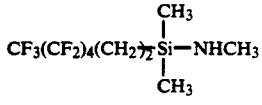

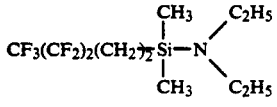

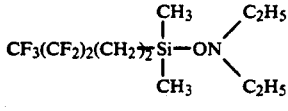

-continued

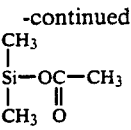

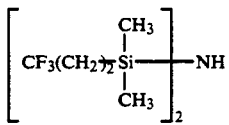

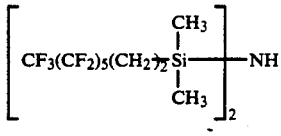

Of such organosilicon compounds represented by the formula, disilazane having a polyfluoroalkyl group is preferred from the standpoints that excellent water repellency can be imparted to polymethylsilsesquioxane powder by the surface treatment thereof with such organosilicon compound and the removal of the compound after the surface treatment is easy.

The polymethylsilsesquioxane powder which can be used in the present invention can be prepared by a process described in JP-A-60-13813 or JP-A-63-103812.

JP-A-60-13813 relates to a process for the preparation of polymethylsilsesquioxane, characterized in that a methyltrialkoxysilane or its partially hydrolyzed condensate is hydrolyzed and condensed in an aqueous solution of ammonia or an amine.

In JP-A-63-103812 the polymethylsilsesquioxane powder which is the raw material for the production of the silica powder of the present invention is such that the particles thereof are separate from each other and substantially spherical, and in the particle size distribution thereof, at least 80% of the particles have a particle diameter in the range of ±30% of the average particle diameter, and is obtained as follows. That is, using as an upper layer a methyltrialkoxysilane and/or its partial hydrolysis condensate, or a mixed solution of the methyltrialkoxysilane and/or its partial hydrolysis condensate and an organic solvent, and using as a lower layer an aqueous solution of ammonia or amine, or a mixed solution of the aqueous solution of ammonia or amine, or a mixed solution of the aqueous solution of ammonia or amine and an organic solvent, a hydrolysis-condensation reaction of the trimethylalkoxysilane and/or its partial hydrolysis condensate and an alkali solution is gradually conducted at the interface. Spherical particles are produced as the reaction proceeds, the particles transfer into the alkali solution layer of the lower layer, and the lower layer changes the color into milky white.

The polymethylsilsesquioxane powder thus obtained is preferably such that each fine particle thereof has an independent and substantially true spherical form, and in the particle size distribution thereof, 80% or more of the fine particles preferably have a particle diameter within the range of ±30% of the average particle diameter of all the fine particles. The average particle diameter thereof is not particularly limited, but is preferably in the range of from 0.1 to 20 μm in consideration of the ease of producing true spherical powder.

The surface treatment of the polymethylsilsesquioxane powder can be conducted in any manner so long as the surface of the polymethylsilsesquioxane powder can be covered with the organosilicon compound represented by the formula. For example, conventional surface treatment method for silica powder can be employed. Specifically, the following methods may be employed: a method in which the organosilicon compound is mixed with the silica powder while maintaining the powder in a fluidized state, thereby to bring the organosilicon compound into contact with the powder to conduct surface treatment (JP-A-56-41263); or a method in which the polymethylsilsesquioxane powder is mixed with the organosilicon compound by stirring them together at a temperature of from room temperature to 300° C., thereby to bring the organosilicon compound into contact with the powder to conduct surface treatment (JP-A-1-185367).

In JP-A-56-41263, the silica powder to be treated in the process of the present invention is fumed silica, precipitated silica, calcined diatomaceous earth silica, quartz silica, and the like, but those are required to have a specific surface area of at least 50 m²/g. If the specific surface area is smaller than 50 m²/g, such a powder is poor in the reinforcing effect as a filler, and is unsuitable to the object of the present invention.

To further increase the treatment effect by the process of the present invention, it is desirable that those silica powders contain a slight amount of water, rather being completely anhydrous state. To this effect, it is preferred that the amount of water is 0.2-7 wt %, preferably 2-5 wt %, on the basis of the dry silica. The reason that the treatment effect is further improved by the presence of water is considered that the presence of silanol group on the surface of the silica powder becomes sure, so that a larger amount of silyl groups can be introduced.

The organosilicon compound used to treat the silica powder can be compounds which are conventionally used for silica treatment, and the representative examples thereof are the following three types.

(1) Silane compound represented by the general formula $$(R^3Si)_aZ$$

wherein R represents a monovalent hydrocarbon group, a represents 1 or 2, and Z represents halogen atom, hydroxy group, —OR', —NR'X, —ONR'₂, —OOCR', —O—, —N(X)— or —S— wherein R' represents an alkyl group having 1 to 4 carbon atoms, and X represents hydrogen atom or the same alkyl group as in R'.

(2) Cyclic silicon compound represented by the general formula

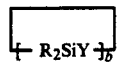

wherein R represents a monovalent hydrocarbon group, b represents an integer of 3-10, and Y represents —O—, —N(X)— or —S— wherein X represents hydrogen atom or an alkyl group having 1-4 carbon atoms.

(3) Silicon compound represented by the general formula

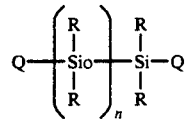

wherein R represents a monovalent hydrocarbon group, n represents an integer of 0-10, and Q represents hydrogen atom, hydroxy group or —OR' wherein R' represents an alkyl group having 1-4 carbon atoms.

The process of JP-A-56-41263 first comprises contacting the silica powder to be treated and the organosilicon compound at temperatures of from room temperature to 110° C., preferably from 30° to 90° C. This contact is conducted to sufficiently adsorb the organosilicon compound on the surface of the silica powder, and it is important to conduct this contact at the above temperature for 30 minutes or more. If this condition is not satisfied and the resulting mixture is directly heat-treated at a high temperature of 120° C. or more, or 130° C. or more, scattering and elimination of the organosilicon compound which is the treating agent occurs, and it becomes difficult to attain the desired high degree treatment effect. Further, scatter of the treatment effect is large, and the treated products having a constant quality cannot be obtained.

It is desirable that the amount of the organosilicon compound in the above contact is 5-30 parts by weight per 100 parts by weight of the silica powder. The contact operation is conducted by the method that both are mixed for a predetermined period of time, or both are uniformly mixed, and then are allowed to stand for a predetermined period of time.

The mixture contacted as described above is then heat-treated at a temperature of 130° C. or more, thereby obtaining the desired silica powder which is highly surface treated. If the heating temperature is too low, the treatment effect cannot be improved, and on the other hand, if the heating temperature is too high, the treatment effect is rather decreased. Therefore, in general, the heating temperature is desirably 150°-200° C.

JP-A-1-185367 discloses that to treat the surface of the polymethylsilsesquioxane powder, any method may be employed so long as it enables the surface of the polymethylsilsesquioxane powder to assume a state of being covered with an organic silicon compound represented by the formula $(R_3Si)_aZ$, wherein R represents a non-substituted monovalent hydrocarbon group, a represents a numeral of 1 or 2, and Z represents a hydrogen atom, a halogen atom, a hydroxyl group, —OR', —NR'X, —ONR'₂, or —OOCR' when a is 1, while —O—, —N(X) or —S— when a is 2, wherein R' represents an alkyl group having 1 to 4 carbon atoms, and X represents a hydrogen atom or an alkyl group having 1 to 4 carbon atoms. For example, a known surface treatment method for a silica powder may be adopted. More specifically, a method of treating a polymethylsilsesquioxane powder by mixing the organic silicon compound with the polymethylsilsesquioxane powder and bringing the former into contact with the latter while keeping the latter in a fluid state (Japanese Patent Publication No. 41263/1981) or a method of treating a polymethylsilsesquioxane powder by mixing the organic silicon compound with the polymethylsilsesquioxane powder and bringing the former into contact with the latter at a temperature of ordinary room temperature to 300° C. under stirring may be adopted.

The amount of the organosilicon compound used for the surface treatment of the polymethylsilsesquioxane powder may be suitably determined according to the kind of the organosilicon compound, the treating time, treating temperature, etc.

After such surface treatment, the resulting polymethylsilsesquioxane powder is heat-treated at a temperature of 50° C. or higher to remove unnecessary substances from the powder, thereby obtaining a surface-treated polymethylsilsesquioxane powder of the present invention.

The surface-treated polymethylsilsesquioxane powder of this invention is usable as a filler or additive for synthetic resins and coating compositions, such as an additive for preventing moisture absorption in molding materials for use in sealing semiconductors, an additive for rust-preventive coating compositions, an additive for icing-preventive coating compositions or an additive for plastic films.

The surface-treated polymethylsilsesquioxane powder of the present invention has excellent water repellency, and by incorporating the powder into synthetic resin, synthetic rubber and the like, the water repellency of these materials can be greatly improved.

The present invention will now be explained in more detail wiht reference to the following Examples, which should not be construed to be limiting the scope of the invention. In the Examples, all parts are by weight unless otherwise indicated.

EXAMPLE 1

Into a four-necked flask equipped with a thermometer, a reflux condenser and a stirrer were introduced 1,000 parts of the organosilicon compound represented by the formula

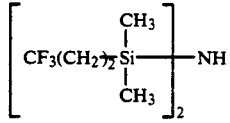

and 1,000 parts of polymethylsilsesquioxane powder having an average particle diameter of 5 μm obtained by the method described in JP-A-60-13813. The resulting mixture was stirred at 170° C. for 15 hours. The thus-treated powder was filtered off with suction using a filter paper, and then dried in a drying oven at 200° C., thereby obtaining surface-treated polymethylsilsesquioxane powder.

The thus-obtained polymethylsilsesquioxane powder was evaluated for water repellency according to the following test method.

14 Parts of a solution prepared by mixing 60 parts of methanol and 40 parts of ion-exchanged water was placed into a vessel, and 14 parts of a solution prepared by mixing 80 parts of methanol and 20 parts of ion-exchanged water was placed into another vessel. Into each of the vessels were added 3 parts of the surface-treated polymethylsilsesquioxane powder obtained above. The vessels were shaken so as to disperse the powder into the solutions, and then subjected to centrifugal sedimentation treatment at 900 r.p.m. for 5 minutes. The polymethylsilsesquioxane powders sedimented by the centrifugal treatment were taken out from each vessel and dried in a drying oven at 200° C. for 1 hour. The weight of the thus-dried powder was measured. From the thus-obtained value of the weight of the sedimented polymethylsilsesquioxane powder and the weight of the surface-treated polymethylsilsesquioxane powder before subjecting to the above test, the sedimentation percentage by weight thereof was calculated using the following equation:

$$\text{Sediment weight percentage (\%)} = \frac{\text{Weight of sediment polymethylsilsesquioxane fine particles}}{\text{Weight of surface-treated polymethylsilsesquioxane fine particles before the test}} \times 100$$

and the water repellency thereof was evaluated in terms of the sedimentation percentage. It should be noted that the smaller the value of the sediment weight percentage, the more excellent the water repellency. The results obtained are shown in the Table below.

COMPARATIVE EXAMPLE

For the purpose of comparison, the sediment weight percentage of the untreated polymethylsilsesquioxane powder used in Example 1 was measured by the same method as in Example 1. The result is shown in the Table below.

EXAMPLE 2

A surface-treated polymethylsilsesquioxane powder was obtained in the same manner as in Example 1 except that the compound represented by the formula

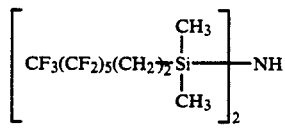

was used in place of the organosilicon compound used in Example 1. The sediment weight percentage of the thus-treated powder was determined in the same manner as in Example 1. The results obtained are shown in the Table below.

EXAMPLE 3

A surface-treated polymethylsilsesquioxane powder was obtained in the same manner as in Example 2 except that in place of the polymethylsilsesquioxane powder used in Example 2, polymethylsilsesquioxane powder having an average particle diameter of 0.3 μm, with each fine particle having an independent and substantially true spherical form, produced by the method described in JP-A-63-103813 was used. The sediment weight percentage of the thus-treated powder was determined in the same manner as in Example 1. The results obtained are shown in the Table below.

EXAMPLE 4

A surface-treated polymethylsilsesquioxane powder was obtained in the same manner as in Example 1 except that the compound represented by the formula

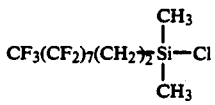

was used in place of the organosilicon compound used in Example 1, and the surface treatment was conducted by maintaining the reaction mixture at 40° C. for 15 hours in place of 170° C. for 15 hours employed in Example 1. The sediment weight percentage of the thus-treated powder was determined in the same manner as in Example 1. The results obtained are shown in the Table below.

TABLE

| Methanol/ion-exchanged water | Example 1 | Example 2 | Example 3 | Example 4 | Comparative Example |
|---|---|---|---|---|---|
| 60/40 (weight ratio) | 2% | 0% | 0% | 0% | 45% |
| 80/20 (weight ratio) | 40% | 20% | 10% | 35% | 100% |

The surface-treated polymethylsilsesquioxane powders obtained in the Examples above were subjected to an indentification test with IR spectrographic analysis by KBr tablet method. The spectrum obtained is shown in the attached FIGURE. Absorption due to a $CF_3CF_2$ group was observed at 1,365.6 cm$^{-1}$. In the IR spectrum of a polymethylsilsesquioxane fine powder by the same test, the absorption at 1,365.6 cm$^{-1}$ is not observed.

While the invention has been described in detail and with reference to specific embodiments thereof, it will be apparent to one skilled in the art that various changes and modifications can be made therein without departing from the

What is claimed is:

1. A polymethylsilsesquioxane powder whose surface has been coated with an organosilicon compound represented by the formula:

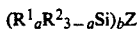

wherein $R^1$ represents an alkyl group substituted by perfluoroalkyl group; $R^2$ represents an unsubstituted monovalent hydrocarbon group; a is an integer of from 1 to 3; b is 1 or 2; and when b is 1, Z is selected from the group consisting of a hydrogen atom, a halogen atom, a hydroxyl group, —$OR^3$, —$NR^3X$, —$ON(R^3)_2$ and —O-$COR^3$, and when b is 2, Z is selected from the group consisting of —O—, —N(X)— and —S—, in which $R^3$ represents an alkyl group having 1 to 4 carbon atoms and X is selected from the group consisting of a hydrogen atom and an alkyl group having 1 to 4 carbon atoms.

2. A polymethylsilsesquioxane powder as claimed in claim 1, wherein the polymethylsilsesquioxane powders are separate from each other and in substantially true spherical form and have a particle size distribution such that 80% or more of the powder have a particle diameter within the range of ±30% of the average particle diameter of the whole powder.

3. A polymethylsilsesquioxane powder as claimed in claim 1, wherein $R^1$ represents $R^4Q$— in which $R^4$ represents a perfluoroalkyl group having 1 to 20 carbon atoms and Q represents an unsubstituted divalent alkylene group having 2 to 6 carbon atoms.

4. A polymethylsilsesquioxane powder as claimed in claim 1, wherein said unsubstituted monovalent hydrocarbon group of $R^2$ in the formula is an alkyl group having 1 to 4 carbon atoms.

* * * * *